United States Patent Office 2,980,091
Patented Apr. 18, 1961

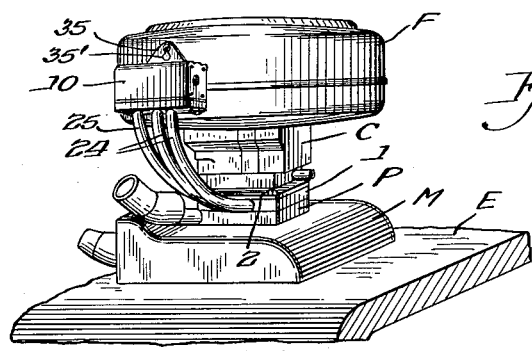
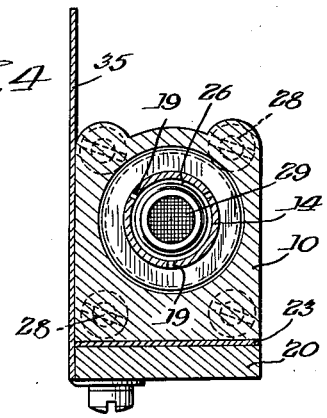
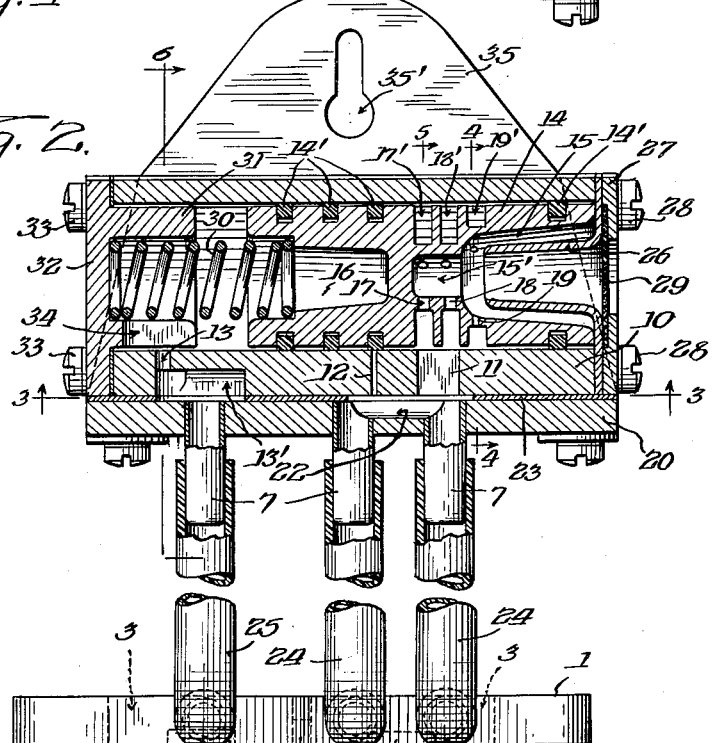
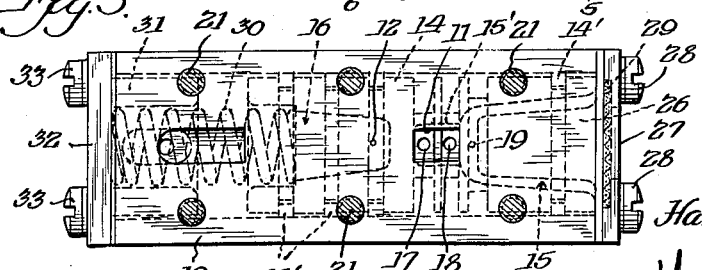

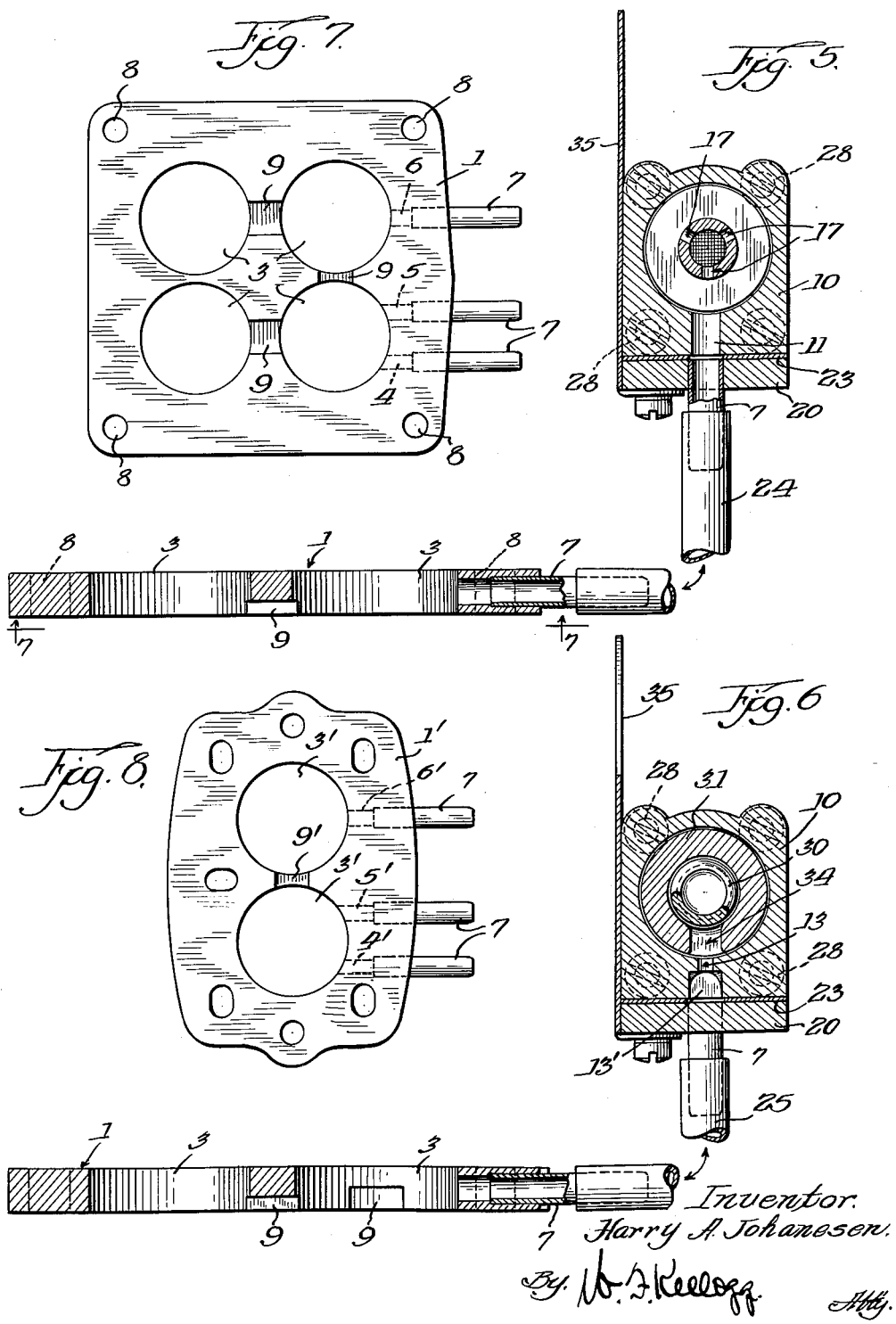

2,980,091

GASEOUS FUEL ECONOMIZING AND IMPROVING DEVICE FOR INTERNAL COMBUSTION ENGINES

Harry A. Johanesen, 2952 W. Altgeld St., Chicago, Ill.

Filed June 25, 1959, Ser. No. 822,869

4 Claims. (Cl. 123—124)

This invention relates to improvements in fuel economizing and improving devices for use in connection with internal combustion engines, being an adjunct or auxiliary to the carburetors thereof whereby the gaseous charges formed thereby and therein will be treated in a manner to materially improve their combustibility with resultant better power potential when delivered into the engine cylinders for firing; also, to derive greater consumption economies through their substantially complete combustion when fired or exploded within said engine cylinders.

The invention is an improvement upon the device described and claimed in my United States patent numbered 2,862,512, issued December 2, 1958.

Additionally, it is an object of my invention to provide a gaseous fuel combustion improving and consumption economizing device which when installed upon the carburetor of an internal combustion engine is automatically operative, being operationally responsive to the engine cylinder created fuel intake suction or partial vacuum whereby a metered and proportioned flow or supply of air will be admitted to and admixed with the carbureted fuel charge.

A further and important object of the invention is to provide a device of the stated character having a gaseous fuel inducting or feeding fitting which can be installed posteriorly of a multiple barrel engine carburetor between it and the multiple throats of an internal combustion engine intake manifold and in communication with each, whereby a balanced supply of gaseous fuel will be delivered to the latter to adequately and efficiently serve the engine cylinders, consequently, avoiding an otherwise fuel starving thereof with its obvious difficulties.

Another object of the invention resides in the provision of an automatically operable fuel economizer or auxiliary air supplying device wherein the air flow metering and proportioning control means thereof is so constructed that it can be installed upon an engine or appurtenances thereto without interference with their proper functionings and without structural disturbance or modification thereof; moreover, readily and conveniently accessible for required adjustments, inspection, repair or other purposes.

The foregoing, as well as other objects, advantages and meritorious teachings of my invention, will be in part obvious and in part pointed out in the following described disclosure thereof, when taken in conjunction with the accompanying drawings, it being understood that the forms of invention presented herein are precise and what are now considered to be the better modes of embodying its principles, but that other and further modifications and changes may be made in specific embodiment without departing from its essential features.

In the drawings:

Figure 1 is a perspective view showing the invention installed between the multiple barrel carburetor and intake manifold of an internal combustion engine with the air flow metering and proportioning control means attached to and supported from the engine air filter.

Figure 2 is a longitudinal section through the air flow metering and proportioning control means illustrating its communicating connection through conduits with the gaseous fuel inducting fitting, the latter being shown in side elevation.

Figure 3 is a longitudinal section taken on the line 3—3 of Figure 2, looking in the direction in which the arrows point.

Figure 4 is a transverse section taken on the line 4—4 of Figure 2, looking in the direction in which the arrows point.

Figure 5 is a transverse section taken on the line 5—5 of Figure 2, looking in the direction in which the arrows point.

Figure 6 is a similar section taken on the line 6—6 of Figure 2, looking in the direction in which the arrows point.

Figure 7 is a plan or top view of the multiple throat gaseous fuel inducting fitting, such as shown in the Figures 2, 5 and 6, and Figure 8 is a plan or top view of a modified form of the gaseous fuel inducting fitting having dual throats instead of the multiple or four throats shown in the form of fitting of Figure 7.

Having reference to the drawings, particularly, to Figure 1, I have shown my invention installed upon a four barrel type of carburetor C provided to an internal combustion engine E, on or above which an air filter F is mounted in the usual communicating relation therewith. The gaseous fuel inducting fitting 1 of the invention, shown in detail in Figure 7 of the drawings, is positioned adjacent to and communicates with the posterior or after side of the carburetor C and to and with the engine four-throated coupling plate P, being connected to and between the same by bolts 2 or other suitable means. The coupling plate P is connected to and communicates with the engine manifold M in the usual manner.

The gaseous fuel inducting plate 1, above mentioned, consists of a flat sheet-like plate of suitable gauge having four ports or ways 3 therein corresponding to the number of barrels of the carburetor C. Ducts 4, 5 and 6 are formed in one side of the plate. The ducts 4 and 5 serve to inlet air to the plate ports 3, while the duct 6 serves to permit the transmission of suction from the invention equipped engine cylinders, via the plate ports 3, to the air flow metering and proportioning control device, hereinafter described. Nipples 7 are engaged in and extend from each of the ducts 4, 5 and 6 to facilitate end engagement and connection of flexible conduits or tubing, also hereinafter described, thereto. Suitable openings, generally indicated by the numeral 8, are formed in the flat plate beyond its ports 3 for receiving the aforesaid connecting bolts 2.

Channels 9 of graduated depths are formed in one face of the flat plate 1 between and communicating with the adjacent ports 3 therein. Thus, intercommunication is effected between said ports and the manifold throats registered and communicating therewith. Consequently, air supplied by the ducts 4 and 5 will be conveyed to each of the four plate ports, and by the same token, suction created by and within the engine cylinders will be transmitted to the duct 6. Because of the depth graduation of the channel 9 a balanced airflow to and suction from the engine cylinders will be effected, preventing fuel starving thereof and in consequence, faulty operation of the engine.

In order that a properly modulated flow of air shall be supplied to the carbureted charge delivered from the carburetor C, for those reasons hereinafter set forth, the airflow metering and proportioning control device illustrated by the drawing Figures 2-6 is provided. It consists of a body 10 having an internally cross-sectionally circular chamber open at both ends. One side thereof is flat and has relatively spaced longitudinally disposed ports 11, 12 and 13 of different lengths, formed therein. The ports 11 and 12 are arranged to one side of the transverse axis of the body 10 and the port 13 is arranged to the opposite side thereof, as will be noted upon reference to Figure 2.

A suction actuatable piston valve 14 is slidably received within the chamber of the body 10. Coaxially disposed inwardly tapered pockets 15 and 16 are formed in and open onto the opposite ends of the valve and are separate, one from the other. The inner end portion of the pocket 15 is preferably reduced in diameter, as at 15', and formed with parallel walls. Radially disposed ducts 17, 18 and 19 are formed in the piston valve intermediately of its ends, communicating with the pocket 15 and its reduced portion 15'. The diameters of the ducts 17 and 18 correspond, while the diameter of the duct 19 which opens into the pocket 15, is less. Said ducts are equi-spaced from each other and the spacing between any two thereof substantially correspond to the length of the port 11 in the body 10, while their overall valve occupied area is greater. Thus, with certain and predetermined sliding movement of the valve in the body chamber, said ducts 17, 18 and 19 will selectively communicate with the ports 11 and 12 in the body side, and with other certain and predetermined sliding, the ducts 17 and 19 will communicate with the ports 11 and 12 in said body side, the purpose of which is hereinafter described.

That the aforesaid communication between the ducts 17, 18 and 19 with the body ports 11 and 12 may be effected, the piston valve 14 is formed with three circumferentially disposed grooves or ways 17', 18' and 19'. Also, it is desirable that said piston valve shall be provided with the usual spring sealing rings 14' for an obvious purpose.

The ports 11 and 12 in the body side function to permit a selectively modulated flow of air through and from the ducts 17, 18 and 19 in the piston valve 14 and from the body 10.

To effect sliding movement of the piston valve within its chamber in the body 14, the port 13 in the opposite end portion of its flat side is provided. Said port, as will be seen in Figure 2, is located beyond the near end of the piston valve 14. Its outer portion is elongated, as indicated at 13'. Hence, suction applied thereto from the cylinders of an equipped and operated engine will be transmitted to the piston valve and will cause its unidirectional sliding within the body chamber.

That the modulated or metered flow of air through the ducts 17, 18 and 19 and the ports 11 and 12 will be conducted to and into the engine intake manifold M for admixture with the gaseous charge supplied thereto from the carbureter C, a flat plate 20 of shape and size corresponding to that of the flat side of the body 10 is engaged over and with the latter and connected to the body by screws 21, or the like. Said plate has relatively spaced and longitudinally disposed openings therein. Certain of these openings are interconnected by a channel 22 and communicate with the ports 11 and 12, while the remaining opening communicates with the port 13—13'. Preferably, a gasket 23 is interposed between the flat plate 20 and the body flat side, for an obvious purpose.

Suitable lengths of flexible conduits or tubing 24 and 25 are engaged in the openings in the flat plate 20 and connected at their remaining ends to or with the nipples 7 of the plate 1. Thereby, the piston valve modulated flow of air and the engine cylinder created suction will be transmitted.

A tapered nozzle or jet 26 having a flanged outer end is seated in that open end of the body 10 adjacent the piston valve pocket 15 and is nestingly received and discharges into the piston valve pocket 15—15', serving to admit and accelerate the supply and flow of air into the metering and proportioning device. It is retained in its seated, nested relation by a ported end wall 27 engaged over the adjacent open end of the chambered body 10 and secured thereto by screws 28. If desired, a screen 29 may be engaged over the end wall port, for an obvious purpose.

To impart longitudinal thrust in one direction to the piston valve 14, a pretensioned coiled spring 30 is endwise engaged and seated in its remaining coaxial pocket 16 with the opposite end thereof seated in a cup 31 carried by the inner side of an end wall 32 engaged over the remaining open end of the body 10. Screws 33, or the like, secure this end wall to said body. Preferably, a slot or way 34 is formed in that portion of the end wall cup adjacent the body port 13 whereby the application of suction, via said port, to or upon the piston valve will be unimpeded.

A bracket plate 35 having a keyhole shaped slot 35' therein is connected to the normally inner side wall of the body 10. Thereby, mounting of the control device upon a convenient or suitable portion of the equipped engine or its air filter F (see Figure 1) is effected.

While I have hereinbefore described my invention as being used in connection with a four barrel type of carburetor, it is to be understood that the same may equally well be adapted for use upon dual-throated carburetors. That such usage may be effected, a dual-throated or ported coupling plate 1' is provided and substituted for the aforesaid four-throated coupling plate 1. Said plate 1', as indicated, is formed with but two ports or ways 3' interconnected and intercommunicating via a channel 9' formed in one side of the plate and opening into said ports and with ducts 4', 5' and 6', similar in form and placement to the ducts 4, 5 and 6 of the coupling plate 1. Nipples 7' are engaged in and extend from each of said ducts in order that the adjacent ends of the flexible conduits or tubing lengths 24 and 25 may be connected thereto.

In usage of the invention and assuming that the coupling plates 1 or 1' and the air and vacuum flow controlling device have been engine installed in the manner hereinbefore described, with firing and operation of the thus equipped engine at an idling speed with the throttle valve (not shown) in "closed" position, a maximum of engine cylinder suction will be created and transmitted to the intake manifold M. This created suction will be transmitted by way of the flexible conduit 25, through the body port 13—13' to and into the adjacent end of the body chamber. Thereby, the piston valve 14 within the body chamber will be "pulled" and so, will move in said chamber toward the body port 13—13' against the tension of the pretensioned coiled spring 30. Thereby, it will be moved from the position shown in Figure 2 of the drawings to the limit of its path of travel in a direction toward the cup 31 on the end wall 32. When in this described position, the ducts will have been disaligned with relation to the port 11, the duct 17 will be registered with the port 12 and the duct 19 registered with the port 11, thereby supplying only a minimum of air to the carbureted gaseous mixture within the intake manifold M.

When the engine throttle valve is partially opened or "cracked," the degree of engine created suction applied to the piston valve 14 will be decreased. At this time, the pretensioned coiled spring 30 will act upon said piston valve to thrust it through the body chamber in a direction toward the nozzle or jet 26, which, as will be borne in mind, is engaged in the piston pocket 15. This sliding movement of the piston valve will be responsive to the degree of the applied suction. Therefore, if the applied suction is of a material degree, said piston valve will be moved to a position within the body chamber where the ducts 17 and 18 will be aligned or partially aligned with the body port 11, permitting a properly proportioned supply of air to be outflowed from the control device into the flexible conduits 24 for discharge into the intake manifold M and admixture with the gaseous charge supplied from the carburetor C.

With further decrease of the engine created suction, so too will its "pull" effect on the piston valve diminish, hence, permitting the coiled spring 30 to further move said piston valve in the body chamber toward the nozzle or jet 26. Concurrently with such movement, greater registration of the ducts 17 and 18 with the body port 11 will be effected and hence, an increased supply of air flow to the carburetor formed charge in the intake manifold M will be provided.

From the foregoing, it will be understood that the piston valve working within the body chamber of the control device is sensitive and responsive to the degree of suction applied thereto via the flexible conduit 25 and the port 13—13'. Because of such responsiveness, it will be understood and appreciated that the piston valve will operate to automatically modulate or regulate the volume of air through the same via the nozzle 26 and the ducts 17, 18 and 19 and ports 11 and 12. In so doing, it will accurately and beneficially proportion the supply of air to the carbureted charge in the engine intake manifold M whereby, with admixture therewith, to materially improve its combustibility and moreover, to effect a maximum economy of fuel consumption.

I claim:

1. A device for proportioning and delivering an augmenting air supply to a gaseous fuel provided by a carburetor, comprising in combination with an internal combustion engine and the intake manifold thereof, a plate having a plurality of intercommunicating ports therein positioned between and communicating with the carburetor and intake manifold, an air intaking chambered body one wall of which has a plurality of ports therein, certain of the ports being located to one side of the transverse axis of the body and graduated in size, and another located to the opposite side of said transverse axis, a piston valve slidable in the body chamber having size graduated ducts therein communicating with said chamber and selectively communicable with the size graduated ports in said body wall, the number of said size graduated ducts being greater than the number of size graduated ports, means in the body chamber engaging one end of the piston valve urging movement thereof in one direction whereby to register certain of the ducts with certain of the size graduated ports, conduits connected to and communicating with the size graduated ports in said body side wall and certain of the ports in said plate, and another conduit connected to and communicating with another of the ports in the plate and said port located to said opposite side of the transverse axis of the body whereby to transmit suction to the body chamber and piston valve.

2. A device for proportioning and delivering an augmenting air supply to a gaseous fuel provided by a carburetor, comprising in combination with an internal combustion engine and the intake manifold thereof, a plate having a plurality of ports therein intercommunicating through channels of different and successively graduated depths formed in one side of the plate, portions of the plate having outwardly opening ducts formed therein certain of which communicate with one of said ports and another of which communicates with another of the ports, an air intaking chambered body one wall of which has a plurality of ports therein certain of which are located to one side of the transverse axis of the body and are graduated in size and another of which is located to the opposite side of said transverse axis, a piston valve slidable in the body chamber having size graduated ducts therein communicating with the chamber and selectively communicable with the size graduated ports in said body wall, the number of said size graduated ducts being greater than the number of size graduated ports, means in the body chamber engaging the piston valve urging movement thereof in one direction whereby to register certain of the ducts with certain of the size graduated ports, conduits connected to and communicating with the size graduated ports in said body side wall and certain of the ducts in said plate, and another conduit connected to and communicating with another of the ducts in the plate and said port located to said opposite side of the transverse axis of the body whereby to transmit suction to the body chamber and piston valve.

3. A coupling plate of the character described having a plurality of corresponding sized ports therein intercommunicating through channels of different and successively graduated depths formed in one side of the plate, portions of the plate having laterally and outwardly opening ducts formed therein certain of which communicate with one of said ports and another of which communicates with another of the ports.

4. In combination with an internal combustion engine intake manifold and carburetor, a plate interposed therebetween and connected thereto having a plurality of ports therein intercommunicating through channels of different and successively graduated depths formed in one side of the plate, portions of the plate having outwardly opening ducts formed therein certain of which communicate with one of said ports and another of which communicates with another of the ports, suction actuated air intaking and outflow metering first means, conduits connected to and communicating with the air outflow of said first means and said certain ports in the plate, another conduit connected to and communicating with said another port of the plate and said first means whereby to transmit suction thereto for actuating the same, and second means in the first means operable for yieldably resisting the extent of actuation of the first means and varying the outflow metering of air thereby.

References Cited in the file of this patent

UNITED STATES PATENTS

| 1,945,192 | Hunt | Jan. 30, 1934 |
| 2,037,459 | Crabb | Apr. 14, 1936 |

FOREIGN PATENTS

| 1,115,622 | France | Jan. 9, 1956 |